US005901231A

United States Patent [19]

Parrella et al.

[11] Patent Number: 5,901,231

[45] Date of Patent: May 4, 1999

[54] PIEZO SPEAKER FOR IMPROVED PASSENGER CABIN AUDIO SYSTEMS

[75] Inventors: Michael J. Parrella, Weston, Conn.; Steven L. Machacek, Alexandria, Va.; Graham P. Eatwell, Cambridge, United Kingdom

[73] Assignee: Noise Cancellation Technologies, Inc., Linthicum, Md.

[21] Appl. No.: 08/533,048

[22] Filed: Sep. 25, 1995

[51] Int. Cl.[6] .............................. H04B 1/00; H04R 25/00

[52] U.S. Cl. .............................. 381/86; 381/99; 381/152; 381/190; 381/389

[58] Field of Search .............................. 381/86, 190, 205, 381/24, 87, 88, 188, 71, 94, 173, 111, 186, 152, 99, 389

[56] References Cited

U.S. PATENT DOCUMENTS

| | | | |
|---|---|---|---|
| 3,423,543 | 1/1969 | Kompanek | 381/152 |
| 4,490,842 | 12/1984 | Watanabe | 381/86 |
| 4,499,340 | 2/1985 | Kasai et al. | 381/152 |
| 4,514,599 | 4/1985 | Yanagishina et al. | 381/152 |
| 4,551,849 | 11/1985 | Kasai et al. | 381/152 |
| 4,638,884 | 1/1987 | Lee | 381/86 |
| 4,774,514 | 9/1988 | Hildebrandt et al. | 381/57 |
| 4,807,294 | 2/1989 | Iwata et al. | 381/86 |
| 5,073,944 | 12/1991 | Hirasa | 381/24 |
| 5,321,756 | 6/1994 | Patterson, Jr. et al. | 381/24 |
| 5,384,855 | 1/1995 | Kwang | 381/86 |

FOREIGN PATENT DOCUMENTS

| | | | |
|---|---|---|---|
| 0096790 | 7/1980 | Japan | 381/86 |
| 0072600 | 6/1981 | Japan | 381/86 |
| 0196696 | 11/1984 | Japan | 381/86 |
| 0198541 | 9/1987 | Japan | 381/86 |
| 0086642 | 4/1991 | Japan | 381/86 |
| 8505004 | 11/1985 | WIPO | 381/205 |

*Primary Examiner*—Curtis A. Kuntz
*Assistant Examiner*—Xu Mei

[57] ABSTRACT

This invention outlines several applications of piezoelectric vibrators to produce quality flat panel speakers in passenger cabin applications. A system consisting of an audio amplifier and transformer is used to drive the piezo speaker. The electronics are packaged so that they fit in small modules that can be attached to a cabin structure to produce a speaker. The invention includes a variety of flat panel speaker designs, including one in which the existing structure is converted into a speaker, and thin membrane and or panels that are fitted with piezoelectric elements. A system consisting of cabin quieting and flat panel speakers is also discussed where the mid and high frequency audio is produced by panel speakers and the low frequency audio is produced from dynamic loudspeakers. The cabin systems discussed in this patent are applicable to automobiles, aircraft, trucks and buses.

2 Claims, 7 Drawing Sheets

PIEZO SPEAKER FOR IMPROVED PASSENGER CABIN AUDIO SYSTEMS

BACKGROUND ART

Conventional loudspeakers while able to reproduce sound well, require a large amount of space and are an inefficient way to convert electrical power into acoustical power. Space requirements are not easily reduced because of the need for a moving coil to drive the diaphragm. Piezoelectric loudspeakers have been proposed as a diaphragm as an alternative to moving coil loudspeakers. Such a device was described by Martin in U.S. Pat. No. 4,368,401 and later Takaya in U.S. Pat. No. 4,439,640. Both inventions dealt with attaching a disc shaped piezo to a diaphragm. Martin's device used a thick glue layer (10 to 50% of the carrier plate thickness) between a carrier plate and the piezo ceramic. The adhesive layer served to attenuate resonance. Takaya accomplishes the same through use of a film with a smaller Q factor than the diaphragm. Both inventors specify disc shaped diaphragms and piezoceramic plates. Kompanek in U.S. Pat. No. 3,423,543 uses a plurality of ceramic wafers made of piezoelectric materials such as lead zirconate-lead titanate mixtures of various shapes. Conductive layers are affixed to both sides of the wafer and then glued to a flat plate.

Kompanek states that the plate is preferably made of a conductive metal such as steel but may be of plastic or paper with a conductive layer thereon forming the surface. Another such device discussed by Kumada in U.S. Pat. No. 4,352,961 attempts to improve the frequency response further by using various shapes for the diaphragm, such as an ellipse. He also claims the ability to form the speaker from transparent piezoceramic materials such as lanthanum doped zirconium titanate so that the speaker can be used in applications such as watch covers and radio dials. He also uses a bimorph to drive the diaphragm rather than a single layer of ceramic. All of the above methods use a flat panel driven by a piezo ceramic device and make no attempt to use a three dimensional structure to improve the sound quality. The diaphragm must be attached to some type of frame and clamped to the frame. Bage, Takaya and Dietzsch in U.S. Pat. No. 4,779,246 all discuss methods of attaching the diaphragm to a support frame. Early efforts used piezo ceramics to drive conical shapes reminiscent of those found in loudspeakers. Such devices can be found in Kompanek, U.S. Pat. No. 3,423,543 and Schafft, U.S. Pat. No. 3,548,116 and 3,786,202. Schafft discusses building a device suitable for use in loudspeakers. This device is of much greater complexity than flat panel speakers and is not suitable for applications where a low profile speaker is needed. In order to constrain the center of the diaphragm from moving, Bage, U.S. Pat. No. 4,079,213, uses an enclosure with a center post. He claims that this reduces the locus of nodal points to the location of the centerpost and therefore improves the frequency response of the device. The enclosure is used to support the center post and has openings to provide for pressure relief, and does not improve the acoustic performance. Piezoelectric speakers were discussed by Nakamura in U.S. Pat. No. 4,593,160, where a piezoelectric vibrator is connected to a diaphragm by coupling members formed by wires. More pertinent work in thin speakers using piezoelectrics was discussed by Takaya in U.S. Pat. No. 4,969,197. Takaya used two opposed plane foam diaphragms with a pair of recesses that minimize the restriction of motion of the piezoelectric driver. Thin speakers were discussed in U.S. Pat. No. 5,073,946 by Satoh et al, which included the use of voice coils. Volume noise cancellation techniques have been discussed by Warnaka in U.S. Pat. No. 4,562,589 for aircraft cabins. Shakers attached to structures for aircraft quieting have been discussed by Fuller in U.S. Pat. No 4,7155,559. This invention differs from Warnaka and Fuller in that the intent is to integrate improved audio by the use of flat panel speakers for the mid and high frequency, while relying on the dynamic loudspeakers of the noise cancellation system for low frequency audio.

BRIEF DESCRIPTION OF THE INVENTION

The present invention in one embodiment involves a module that can be placed on the door or ceiling panels of an automobile, truck, aircraft, or other passenger cabin to produce good mid and high (tweeter) range sound quality. Dynamic equalization using additional piezoelectric elements or the electric potential generated by the flexing of the piezoelectric element is also included as an additional feature of the present invention. One advantage of the present invention is that the production of sound is close to the passengers ears. Since mid range and high frequency sound are the most readily attenuated by the materials in the automobile (seat cushions, door panels etc.), placing these sound sources close to the listener improved the perceived sound quality. A single low frequency (woofer) dynamic loudspeaker provides all the bass required for high quality audio, since the low frequencies are not readily attenuated by the materials in the automobile (seat cushions, door panels etc.). This type of audio system can also be adapted to a noise reduction system, where the dynamic loudspeakers of the noise reduction system are used to provide the low frequency audio. Although the application discussed here is for an automobile, the same approach can be used in aircraft, trucks, recreational vehicles and buses.

DETAILED DESCRIPTION OF THE INVENTION

Figure 1:
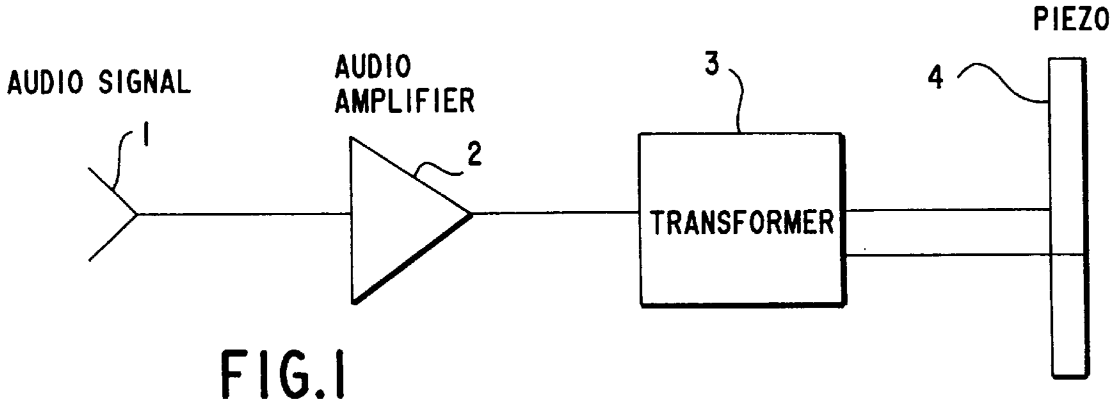
FIG. 1 is a block diagram of the audio circuit.

All speaker systems require some form of amplifier. The present state of the invention utilizes a system illustrated in the block diagram of FIG. 1. The audio signal 1 is fed into a linear amplifier 2 that provides the signal "boost" or amplification. The output of the amplifier 2 is fed into a 17-to-1 transformer 3 to increase the voltage swing at the piezoelectric element 4. This is necessary since the displacement in the piezoelectric is directly related to the applied electrical potential.

Figure 2:
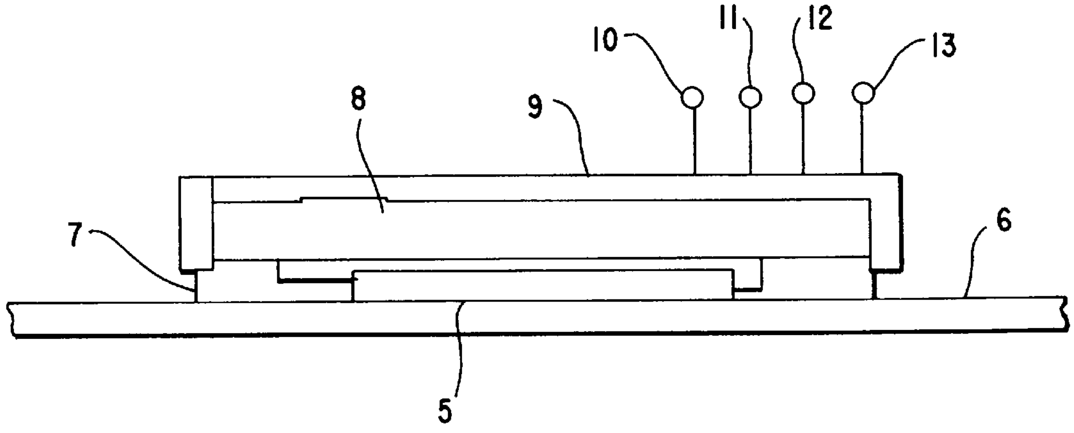
FIG. 2 is a drawing of the module that can be applied to a surface to create a piezoelectric speaker system.

FIG. 2 illustrates the assembly of the piezoelectric speaker module with built in damping material. The piezoelectric element 5 is applied directly to the surface to be excited Damping material 7 is then placed in proximity to the piezoelectric element, in this case a panel diaphragm. Preferably, the piezoelectric element is surrounded by damping material 7. Placing the damping material in proximity to the piezoelectric element has two benefits. It provides a reduction in the structural resonances in the surface the piezoelectric is applied to, and it insulates the high voltage used to drive the piezoelectric from the outside world. This is important to avoid electrical shock due to the high voltages applied to the piezoelectric. The audio amplifier is potted in a box 8 with thermally conductive epoxy. This not only protects the electronics from the environment, but it also provides good distribution of the heat load from the audio amplifier, and prevents possible electrical shock. A cover 9 for substantially covering the electronics is placed over the electronics box providing a final seal of the unit from the outside world. The positive and negative power terminal 10,11 and the positive and negative audio signal terminals 12,13 are shown extending outside the box. The mass of the lid and the electronics box, mounted to the damping material is basically a load on a spring, which can be tuned to add damping at the fundamental resonance of the structure.

Figure 3:
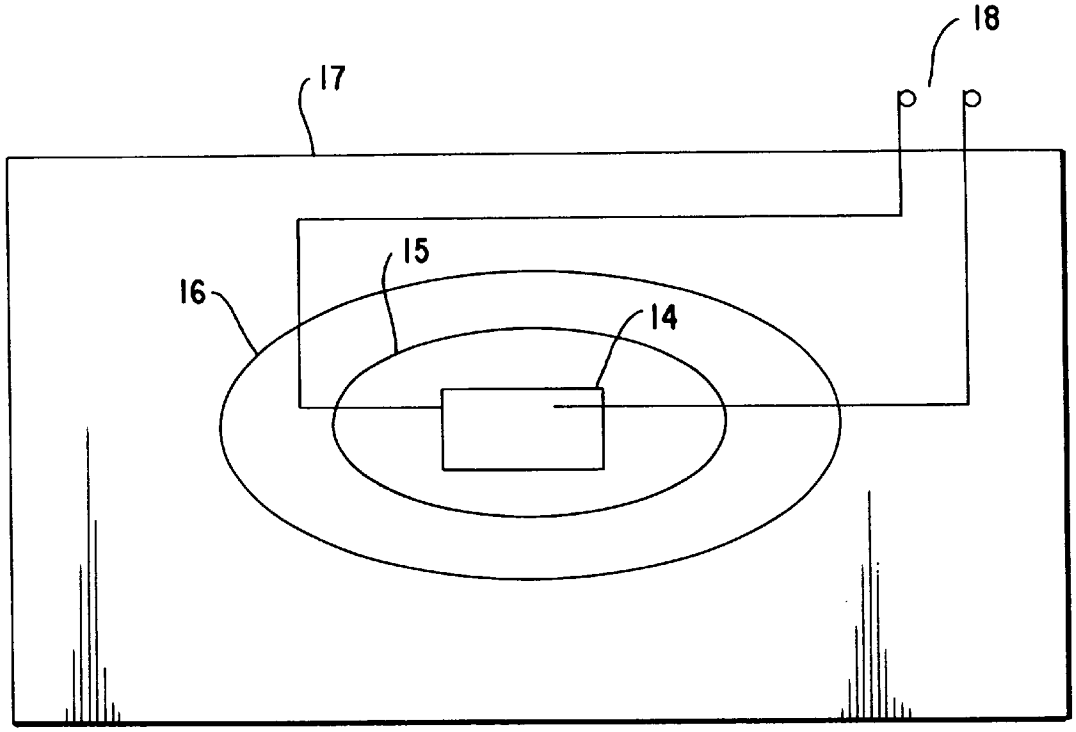
FIG. 3 illustrates one possible flat panel speaker design for the passenger cabin.

FIG. 3 illustrates one possible flat panel speaker design for the passenger cabin. A piezoelectric patch 14 is bonded to the center of coupling layer in the form of a small, thin plastic elliptical disc 15 that provides a transition to a larger elliptical disc 16 that is bonded to panel 17. This may be a light weight foam plastic panel or a trim or lining panel of the cabin. The elliptical shaped discs help reduce the severity of structural resonances in the thin panel speaker and also provide a coupling transition to the panel. The panel should be made from anisotropic materials to further mitigate the effects of structural resonances. An electrical terminal 18 is used to provide the audio signal.

Figure 4:
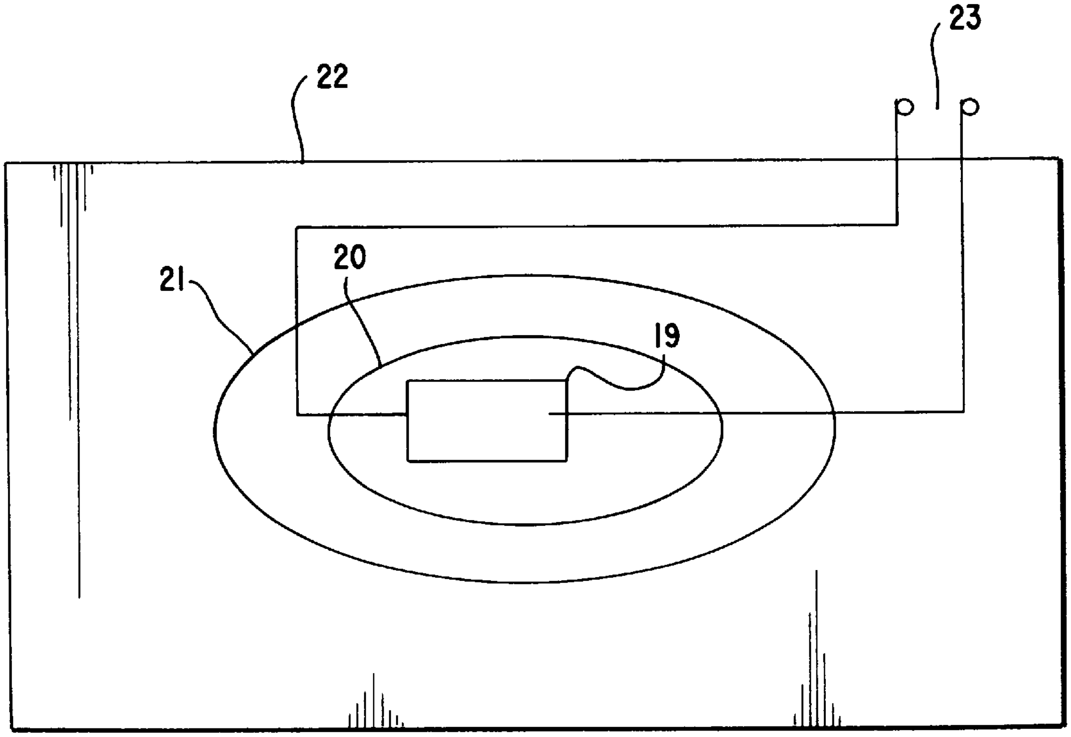
FIG. 4 illustrates another possible flat panel speaker design for the passenger cabin.
Figure 5A:
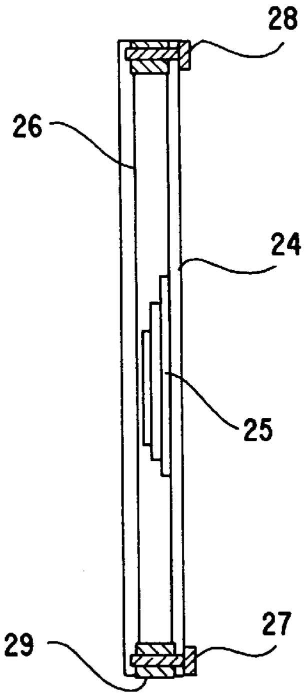
FIGS. 5*a* and 5*b* illustrates a closed volume flat panel speaker which uses the panel designs illustrated in FIGS. 3 and 4.
Figure 5B:
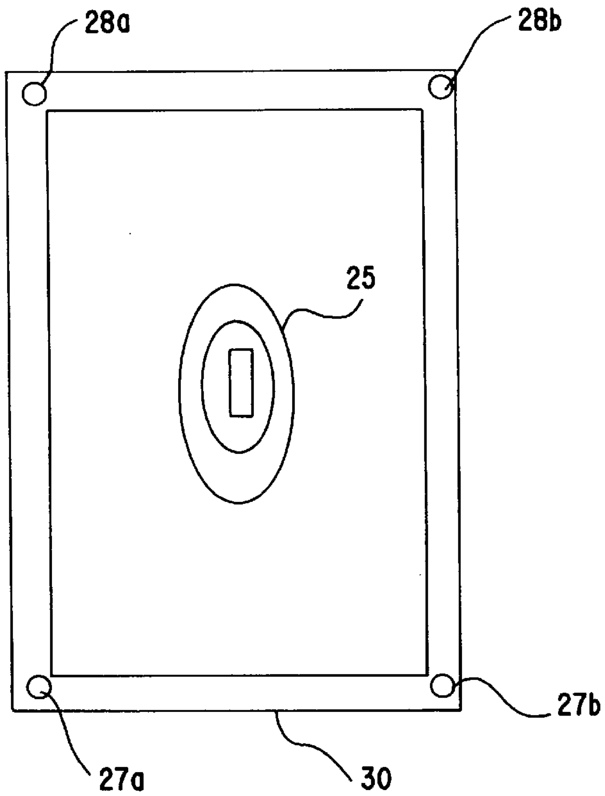
Figure 6A:
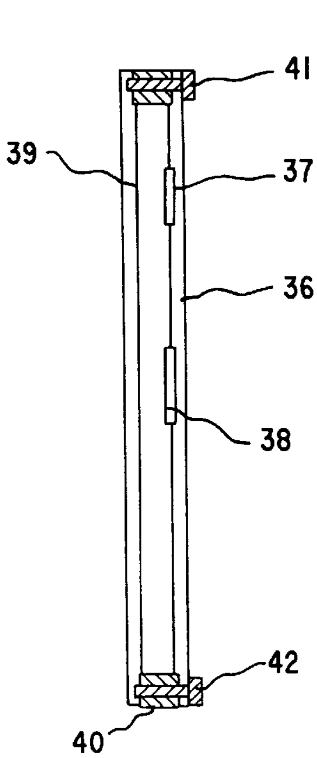
FIGS. 6*a* and 6*b* illustrates a closed volume flat panel speaker which uses a thin panel fitted with two piezoelectric elements.
Figure 6B:
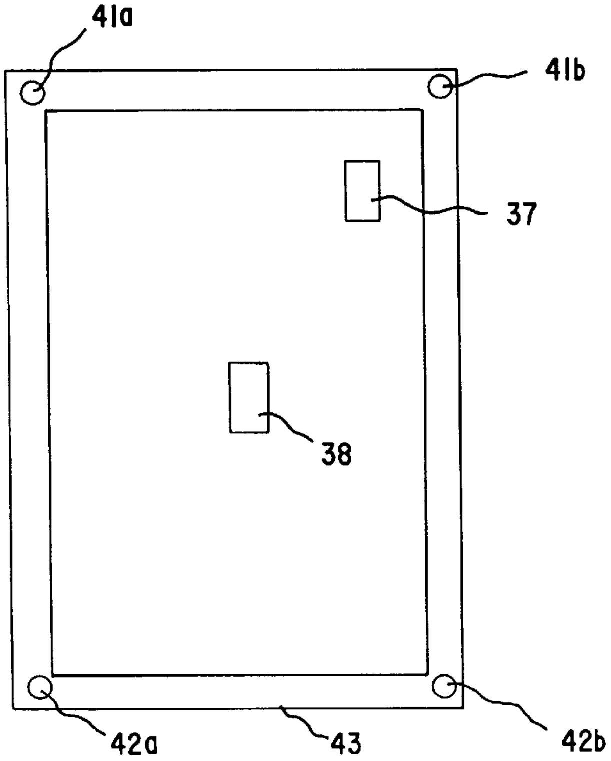

FIG. 4 illustrates another possible flat panel speaker design for the passenger cabin. A piezoelectric patch 19 is bonded off center to a small, thin plastic elliptical disc 20 that provides a transition to a larger elliptical disc 21 that is bonded to panel 22. This may be a light weight foam plastic panel or a trim or lining panel of the cabin. The elliptical shaped discs help reduce severity of structural resonances in the thin panel speaker and also provides a coupling transition to the panel. The placement of the piezoelectric patch off center provides additional reduction in structure resonances. The panel should be made from anisotropic materials to further mitigate the effects of structural resonances. An electrical terminal 23 is used to provide the audio signal.

FIGS. **5*a* and 5*b* illustrates a closed volume flat panel speaker which uses the panel designs illustrated in FIGS. 3 and 4. The panel 24 is fitted with the combination of piezoelectric element and transition layers 25 as discussed above. The volume is closed from the back with a box frame means comprising a thin plate 26 that is held together with four screws to a frame. A front view of the flat speaker 30 shows the location of the four screws 31, 32, 33, 34 and the combination (in relief) 35** of the piezoelectric element and the elliptical transition layers. The panel is only fixed at the corners to provide a high degree of compliance. The four sides of the panel are sealed with a flexible cover, (thin plastic sheet or tape). This seal prevents self canceling of the pressure waves that wrap around the edges of the panel. The cavity is filled with a fiber glass insulation to dampen any cavity resonance.

The panel 24 may be part of the roof liner or trim of the cabin, in which case plate 26 will be the structure (such as the roof). In this case the screw and frame are not needed, but the trim must be acoustically sealed to the structure at the edges so as to form an enclosure or cavity between the panel 24 and the plate 26.

FIGS. **6*a* and 6*b* illustrates a closed volume flat panel speaker which uses a thin panel 36 fitted with two piezoelectric elements 37, 38. The volume is closed from the back with a thin plate 39 and held together with four screws to a frame 40. A front view of the flat speaker 43 shows the location of the four screws 46, 47, 48, 49 and the location of the piezoelectric elements 44, 45. The element 44 placed near the center excite predominately odd modes of vibration which produce the lower frequency pressures waves. The piezoelectric element 45** placed near the fixed corner will excite both even and odd modes and the combined effect of the two elements will result in a flatter frequency response. The panel is only fixed at the corners to provide a high degree of compliance. The four sides of the panel are sealed with a flexible cover, (thin plastic sheet or tape). This seal prevents self canceling of the pressure waves that wrap around the edges of the panel. The cavity is filled with a fiber glass insulation to dampen any cavity resonance.

Figure 7:
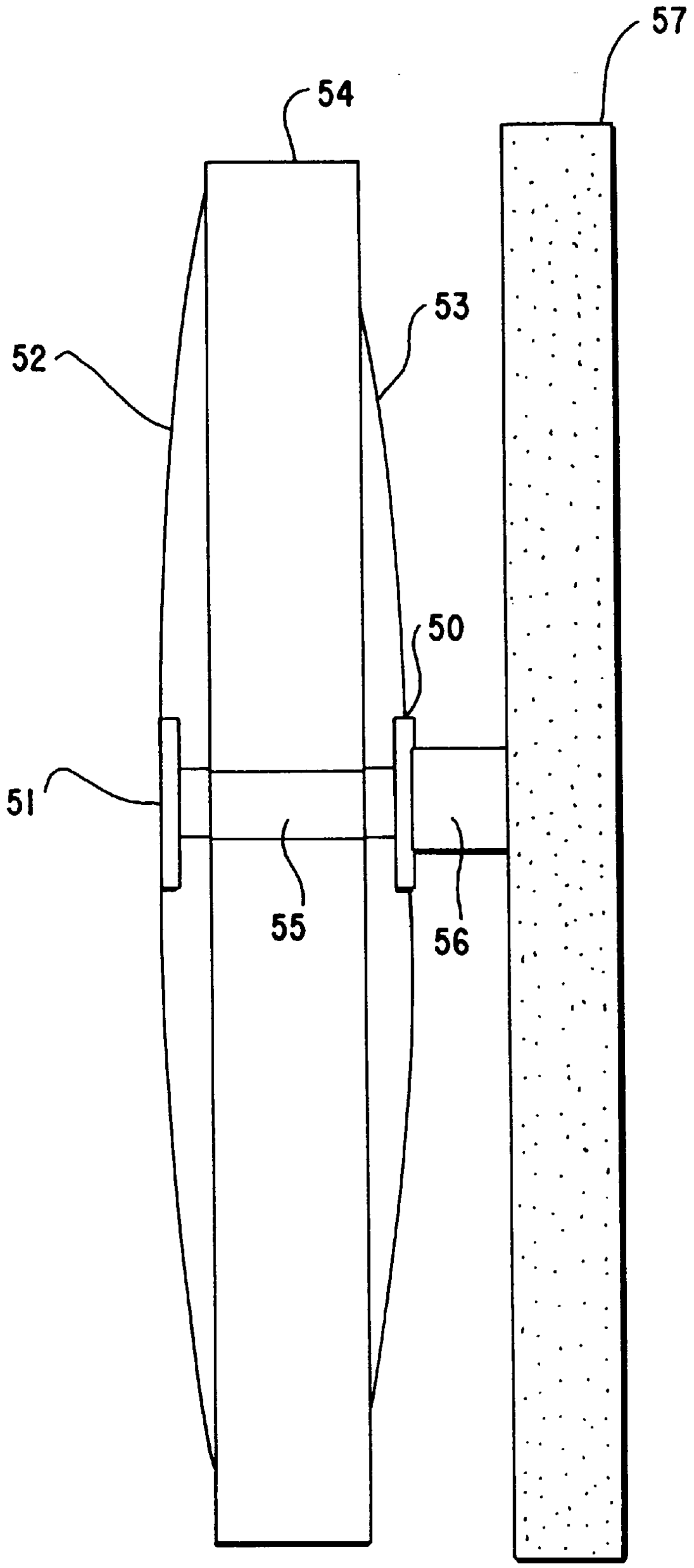
FIG. 7 is a flat panel speaker that utilizes piezoelectric patches bonded to two stretched plastic diaphragms, that are supported by a rigid frame and held in tension by a rigid post.

FIG. 7 is a flat panel speaker that utilizes piezoelectric patches 50, 51 bonded to two stretched plastic diaphragms 52, 53 that are supported by a rigid frame 54 and held in tension by a rigid post 55. The tension in the diaphragm provides additional acoustic energy when the piezoelectric is excited and also increases the modal density, which helps to flatten the frequency response. The diaphragms are of slightly different size to generate more frequency components and thus a flatter frequency response. A rubber stand off 56 is used to isolate the direct panel vibrations from the ceiling 57 of the passenger cabin.

Figure 8:
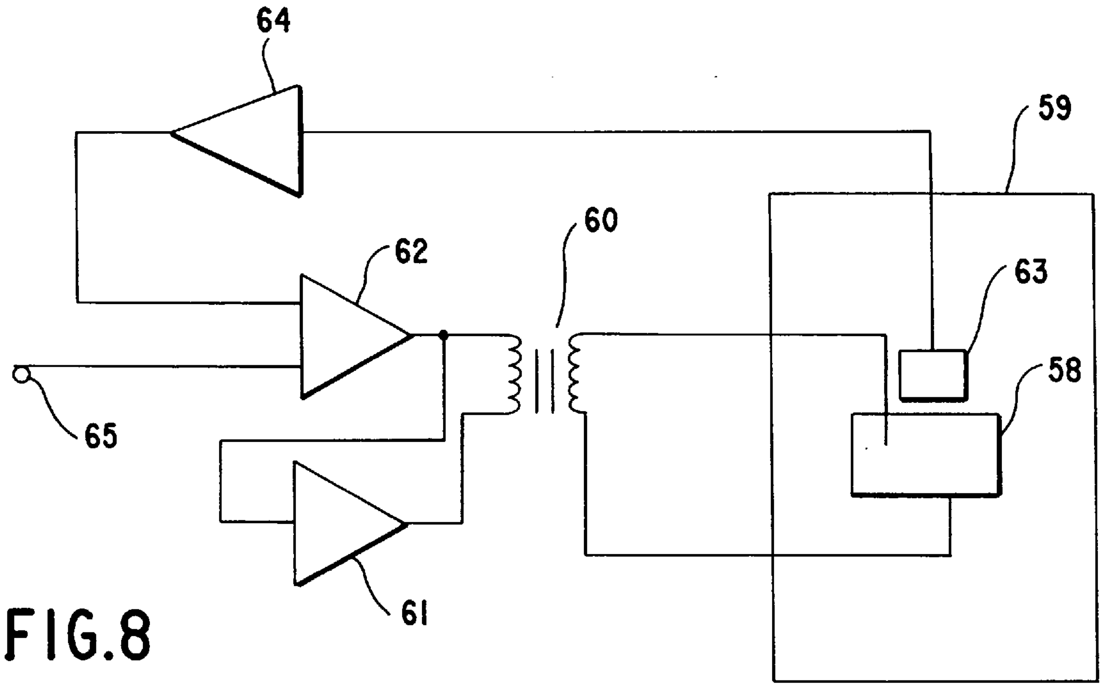
FIG. 8 illustrates an approach to equalization.

FIG. 8 illustrates one approach to equalization. A piezoelectric patch 58 is mounted to a structure to be vibrated 59. The piezoelectric element is driven by a transformer 60 and a pair of linear power amplifiers 61, 62 in a "push-pull" mode. A smaller piezoelectric patch 63 is placed on the panel to sense the strong resonant vibrations in the panel. This signal is amplified to an appropriate level by an operational amplifier 64, which is then subtracted from the input audio signal 65 in the input of the amplifier.

Figure 9:
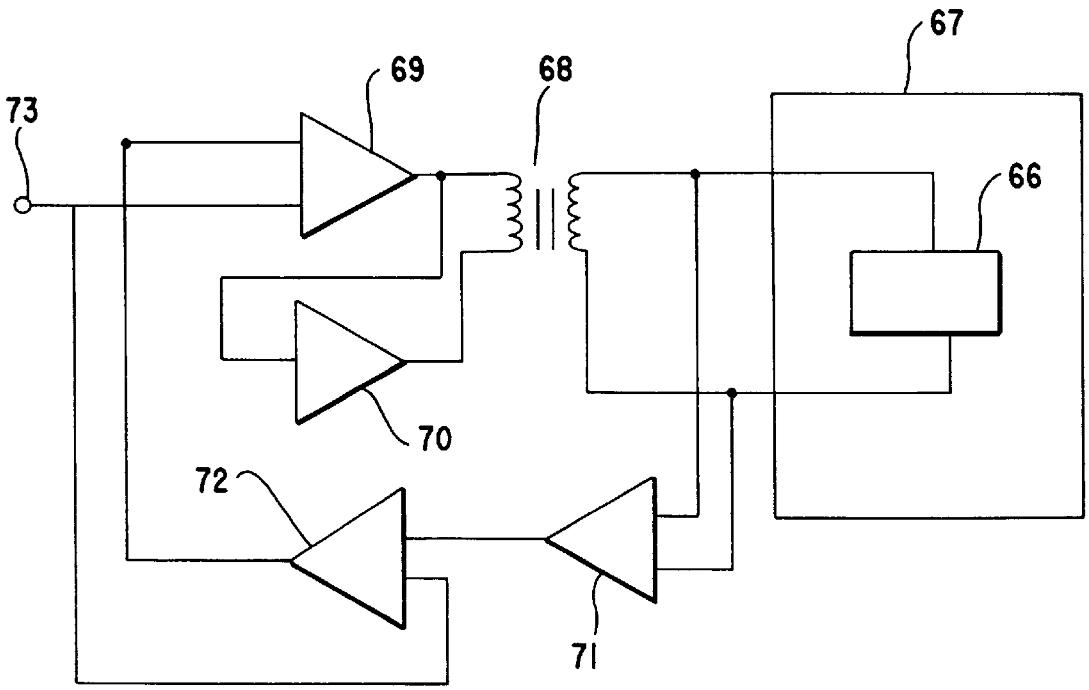
FIG. 9 illustrates the audio driver and a possible form of equalization that utilizes the signal generated by displacements in the piezo as a measure of panel resonance.

FIG. 9 illustrates the audio driver with another possible form of equalization that utilizes the signal generated by displacements in the piezo as a measure of the panel resonance. A piezoelectric patch 66 is mounted on the structure 67 to be vibrated. The piezoelectric element is driven by a transformer 68 and a pair of linear power amplifiers 69, 70 in a "push-pull" mode. A differential operation amplifier 71 is used to pick up the signal on the secondary side of the transformer (both the driving audio signals and the signals generated by the piezoelectric driven panel resonance). The gain of the amplifier 71 is set to a value to scale this combined signal back to the input levels of the audio signal. An additional differential operational amplifier 72 is used to subtract the input audio signal 73 so that the remaining signal is composed of the electrical signal generated by the piezoelectric element. Any significant signal created by the piezoelectric element are the result of strong panel resonances. This signal is subtracted from the audio drive to reduce the peaks in the frequency response of the panel.

Figure 10:
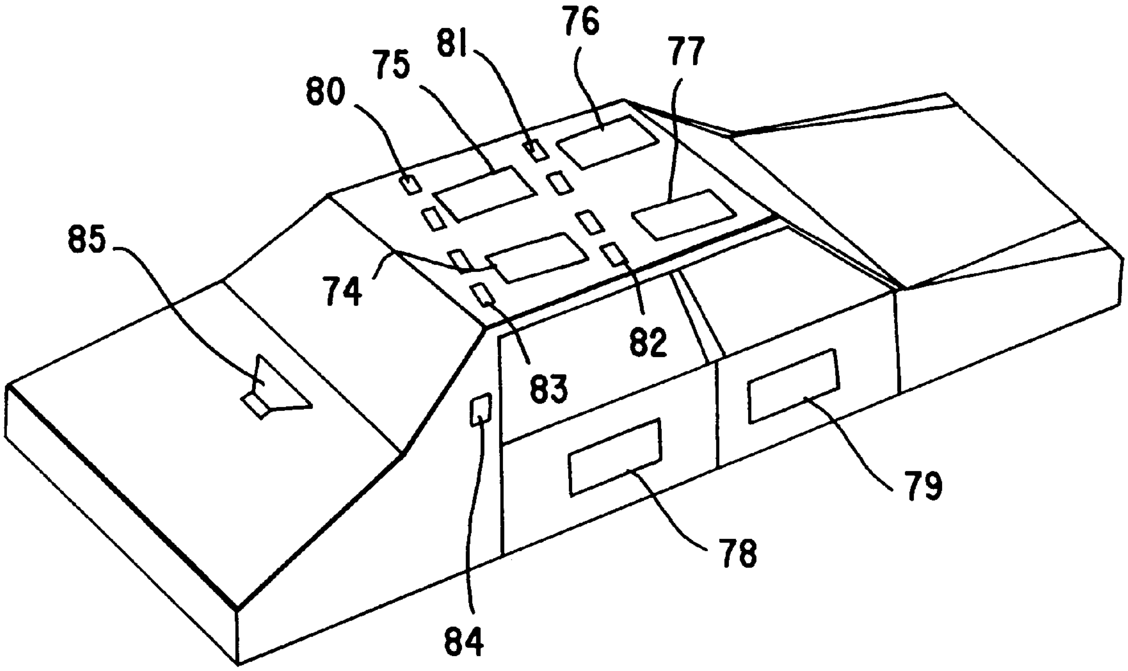
FIG. 10 illustrates the locations of the flat panel speakers in a passenger cabin, in this case, an automobile.

FIG. 10 illustrates the locations of the flat panel speakers in a passenger cabin, in this case an automobile. Four mid range panels 74, 75, 76, 77 are part of, then, or form part of, the roof liner of the automobile, and one possibly in each door 78, 79. Pairs of tweeters 80, 81, 82, 83 are also placed in, or form part of, the roof liner. Tweeters 84 can also be placed on the sides of the passenger cabin frame as shown. The advantage of this configuration is that the sound is generated close to the passengers' ears. Since mid range and high frequency sound are the most readily attenuated by the materials in the automobile (seat cushions, door panels etc.), placing these sound sources close to the listener improved the perceived sound quality. A single low frequency (woofer) dynamic loudspeaker 85 provides all the bass required for high quality audio since the low frequencies are not readily attenuated by the materials in the automobile (seat cushions, door panels etc.). In another embodiment, the piezoelectric driven flat speakers are comprised of piezoelectric elements that drive selected areas of the trim or liner of the passenger cabin.

Figure 11:
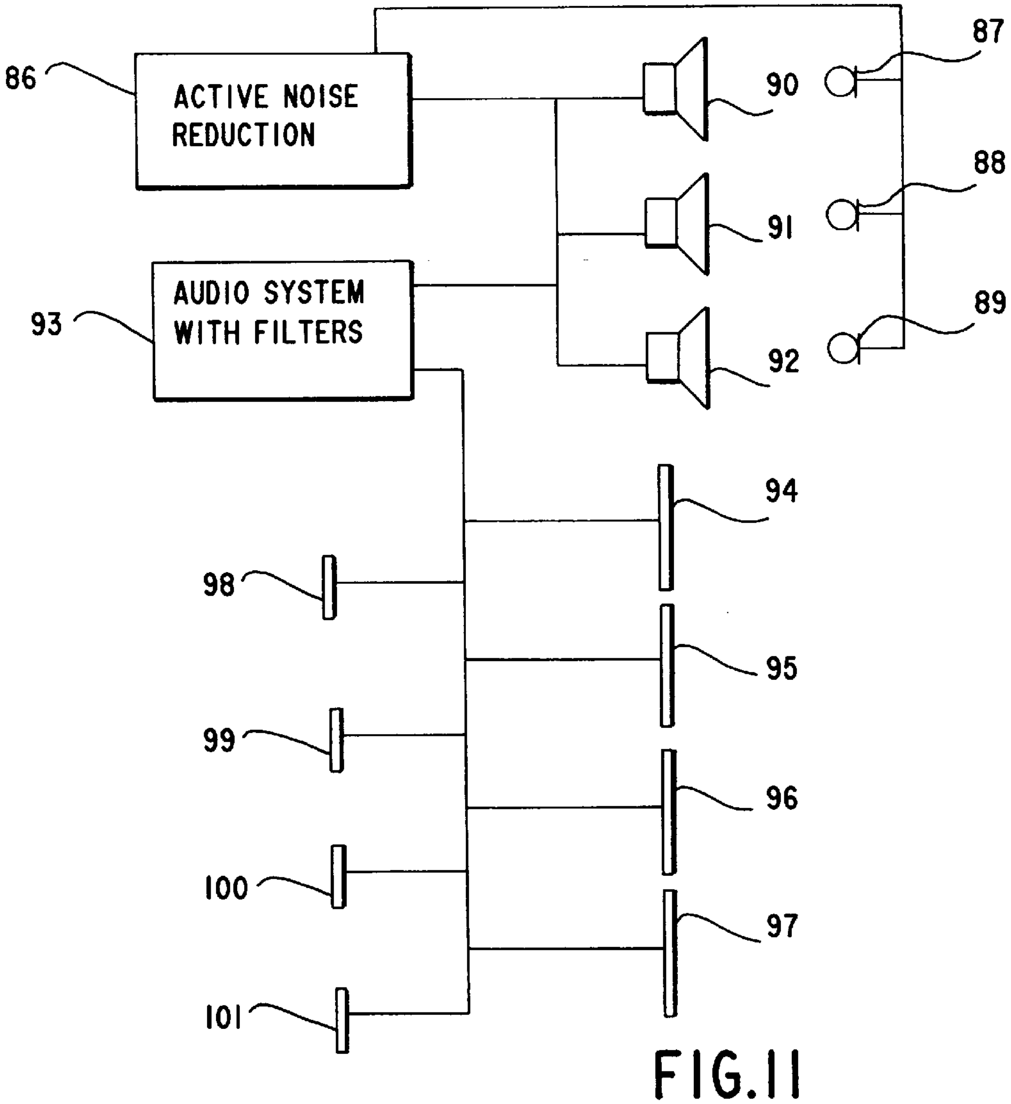
FIG. 11 illustrates the integration of flat panel speaker with an active noise reduction system.

FIG. 11 illustrates a system for a passenger cabin that would include an active noise reduction (ANR) system. The ANR system 86 would consist of at least one of each, but preferably numerous microphones 87, 88, 89 and low frequency dynamic loudspeakers 90, 91, 92. The audio system 93 would utilize the speaker in the ANR system for low frequency audio and flat panel mid range 94, 95, 96, 97 and flat panel tweeters 98, 99, 100, 101. This system would provide the added benefit of a noise reduction system with the improved audio performance resulting from better placement of the mid range and high frequency sound sources.

Figure 12:
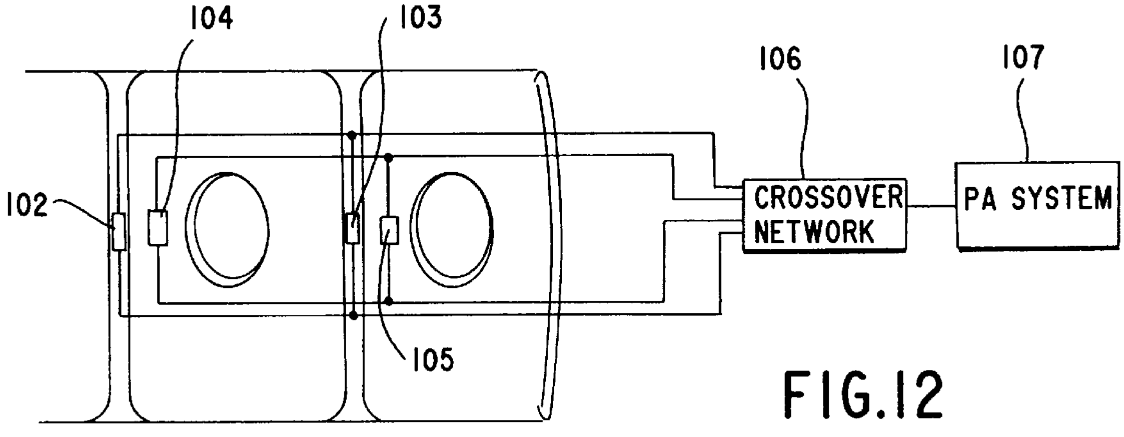
FIG. 12 illustrates the installation of piezoelectric loud speakers in aircraft cabin trim.

FIG. 12 illustrates the installation of piezoelectric loud speakers in aircraft cabin trim. In this particular application the speakers are used as part of the PA system. Piezoelectric elements 102, 103 are placed on the stiff part of the trim to produce the high frequency audio. Piezoelectric elements 104, 105 are placed on the thinner more flexible part of the trim to produce the low and mid range frequencies so that collectively lower, mid and upper range frequency sounds can be produced during vibration of the trim, i.e., when electric potential is applied to the piezoelectric elements. When coupled with a public address system, a crossover network 106 is used to slit the audio into its high and lower frequency components as it is transmitted from the PA System 107.

Piezoelectric materials exist in a variety of forms as naturally occurring crystalline minerals, such as quartz, manufactured crystalline and other materials, plastic materials, including films and foams. All these materials are considered as part of this invention. Furthermore, piezoelectric materials are merely used as illustrative of thin sheet-like or plate-like materials that may appropriately be used to form transducers. Such other transducers may include magneto-strictive transducers, electromagnetic transducers, electro-static transducers, micro-motors, etc.

The forgoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method of reproducing sound within a passenger cabin from an audio signal having lower, mid and upper frequency range components, said method comprising (a) covering portions of the passenger cabin with trim capable of producing a sound when vibrated by an excited piezoelectric element, said trim having a first area which will produce a lower range frequency sound when vibrated, a second area which will produce a mid range frequency sound when vibrated, and a third area which will produce an upper range frequency sound when vibrated;

(b) attaching piezoelectric elements to the trim, with separate piezoelectric element being attached to each of said first, second and third areas of the trim to vibrate at least some of each of said first, second and third areas of the trim; and (c) applying electric potential to the piezoelectric elements to excite the piezoelectric elements to thereby vibrate the trim attached thereto to produce sounds in accordance with the audio signal.

2. The method of claim 1 further comprising originating the audio signal from a public address signal and utilizing a crossover network located intermediate the public address system and the piezoelectric elements to split the audio signal of the public address system into lower, mid and upper frequency range components.

* * * * *